US009977215B2

(12) United States Patent
Mitani

(10) Patent No.: US 9,977,215 B2
(45) Date of Patent: May 22, 2018

(54) LENS BARREL

(71) Applicant: Konica Minolta, Inc., Tokyo (JP)

(72) Inventor: Yoshifumi Mitani, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 74 days.

(21) Appl. No.: 15/002,493

(22) Filed: Jan. 21, 2016

(65) Prior Publication Data

US 2016/0216475 A1 Jul. 28, 2016

(30) Foreign Application Priority Data

Jan. 23, 2015 (JP) .................................. 2015-011043

(51) Int. Cl.
*G02B 7/02* (2006.01)
(52) U.S. Cl.
CPC .................................... *G02B 7/021* (2013.01)
(58) Field of Classification Search
CPC . G02B 7/021; G02B 7/02; G02B 7/04; G02B 7/026; G02B 7/10; G02B 7/105; G03B 17/14; G03B 17/425; G03B 17/02
USPC ....... 359/827, 699, 701, 704, 706, 818, 819, 359/823, 826, 830; 396/428, 535, 529
See application file for complete search history.

(56) References Cited

U.S. PATENT DOCUMENTS 8,405,922 B2 * 3/2013 Terahara ................ G02B 7/021
359/826

FOREIGN PATENT DOCUMENTS

JP 2003-140017 A 5/2003

OTHER PUBLICATIONS

English translation of JP 2003-140017, machine translated on Jun. 14, 2017.*

* cited by examiner

*Primary Examiner* — Jie Lei
(74) *Attorney, Agent, or Firm* — Baker & Hostetler LLP

(57) ABSTRACT

A lens tube includes: a cylindrical exterior member having one axial end disposed on an object side and the other axial end disposed on an image side; a cylindrical protective member including an elastic body protecting the exterior member; and a cylindrical attachment-mounting member disposed on the inside of the exterior member and configured to mount an attachment, the protective member including: a cylindrical body disposed between the exterior member and the attachment-mounting member; an exterior-member protection portion provided at an axial end on the object side of the cylindrical body to project to the object side; and a flange portion projecting radially inwardly from an inner periphery of the cylindrical body and facing an axial end surface on the image side of the attachment-mounting member, the cylindrical body and the flange portion having at least three notched portions, the attachment-mounting member including at least three fixing portions.

5 Claims, 5 Drawing Sheets

LENS BARREL

The entire disclosure of Japanese Patent Application No. 2015-011043 filed on Jan. 23, 2015 including description, claims, drawings, and abstract are incorporated herein by reference in its entirety.

BACKGROUND OF THE INVENTION

Field of the Invention

The present invention relates to a lens barrel.

Description of the Related Art

Lens barrels having a cylindrical exterior member are widely known. The exterior member has one axial end disposed on an object side, and the other axial end disposed on an image side. One end surface being on the object side of the exterior member tends to hit against another member, and is easily scratched. For this reason, protective members for protecting the exterior member are often employed. For example, JP 2003-140017 A discloses a lens barrel (lens tube) including a protective member (elastic member) for protecting the exterior member.

The protective member of the lens barrel disclosed in JP 2003-140017 A includes a rubber material or the like, and is fitted to the exterior member to cover one end surface of the exterior member by an elastic force of the protective member.

However, the protective member of JP 2003-140017 A is fitted to the exterior member by its own elastic force, and thus, deterioration such as elongation of the protective member due to change over the years causes rattle between the exterior member and the protective member, and unfortunately, the protective member easily comes off the exterior member.

SUMMARY OF THE INVENTION

An object of the present invention is to provide a lens barrel unlikely to come off an exterior member, even if a protective member changes over the years.

To achieve the abovementioned object, according to an aspect, a lens barrel reflecting one aspect of the present invention comprises a cylindrical exterior member having one axial end disposed on an object side and the other axial end disposed on an image side, a cylindrical protective member including an elastic body protecting the exterior member, and a cylindrical attachment-mounting member disposed on the inside of the exterior member, the cylindrical attachment-mounting member being configured to mount an attachment, the protective member including a cylindrical body disposed between the exterior member and the attachment-mounting member in a radial direction of the exterior member, an exterior-member protection portion provided at an axial end on the object side of the cylindrical body to project to the object side from an end surface on the object side of the exterior member, and a flange portion provided at an axial end on the image side of the cylindrical body, the flange portion projecting radially inwardly from an inner periphery of the cylindrical body, facing an axial end surface on the image side of the attachment-mounting member in the axial direction of the attachment-mounting member, the cylindrical body and the flange portion having at least three notched portions formed in a circumferential direction to be notched to penetrate from outer peripheral surfaces of the cylindrical body and the flange portion to the inner peripheral surfaces thereof, the attachment-mounting member including at least three fixing portions on the outer periphery in a circumferential direction, the fixing portions being configured to fix the exterior member, the fixing portions being disposed to be positioned on the inside of the notched portions.

According to this configuration, the cylindrical body of the protective member is disposed between the exterior member and the attachment-mounting member in the radial direction of the exterior member, and thus, for example, even if the protective member changes over the years, the protective member is unlikely to come off the exterior member. In addition, the protective member includes the exterior-member protection portion at the axial end on the object side of the cylindrical body, and the flange portion at the end on the image side, and thus, the protective member is restricted in movement in the axial direction of the exterior member, and the protective member is unlikely to come off the exterior member. Further, the notched portions notched to penetrate from the outer peripheral surfaces to the inner peripheral surfaces are formed in the cylindrical body and the flange portion, and thus, when the protective member includes a synthetic rubber, manufacture thereof is facilitated and assembling thereof is also facilitated.

Further, each of the fixing portions is disposed to be positioned on the inside of the notched portion, and thus, for example, when the attachment-mounting member and the exterior member are fixed through a fixing bolt, the attachment-mounting member and the exterior member are reliably fixed.

According to another aspect, in the lens barrel, the attachment-mounting member preferably includes projection portions inserted into the notched portions, the projection portions are preferably provided to project radially outwardly from an outer peripheral surface of the attachment-mounting member, abutting on an inner peripheral surface of the exterior member, the fixing portions being preferably formed in whole or part of the projection portions.

Therefore, the projection portion defines a radial position of the attachment-mounting member relative to the exterior member, and an axis of the attachment-mounting member is aligned with an axis of the exterior member to inhibit eccentricity to each other. Thus, for example, while the attachment-mounting member is mounted to the exterior member, a lens group can be inserted on the inner peripheral side of the exterior member to be disposed at a predetermined position.

Further, for example, when the attachment-mounting member and the exterior member are fixed through the fixing bolt, the attachment-mounting member and the exterior member can be further reliably fixed.

According to another aspect, in the lens barrel, the exterior member preferably includes a plurality of positioning projection pieces provided on the inner peripheral surface of the exterior member to project radially inwardly from the inner peripheral surface, the positioning projection pieces preferably including a contact stop portion provided on an end surface on the object side of each positioning projection piece, the contact stop portion being preferably configured to make contact with and stop the projection portion.

According to this configuration, the attachment-mounting member is axially positioned with respect to the exterior member. Therefore, for example when the attachment-mounting member is inserted into the exterior member until the projection portion makes contact with and stops at the contact stop portion, while the protective member is mounted to the attachment-mounting member, the attachment-mounting member and the protective member are disposed at a predetermined position in the axial direction of the exterior member.

According to another aspect, in the lens barrel, at least one of the projection portions preferably includes an insertion recess portion configured to receive insertion of the positioning projection piece to prevent circumferential turning of the attachment-mounting member to the exterior member.

According to this configuration, the attachment-mounting member is circumferentially positioned with respect to the exterior member. Therefore, for example, when the exterior member and the attachment-mounting member are fixed through the fixing bolt, the exterior member and the attachment-mounting member can be readily fixed to each other with the fixing bolt, and work using the fixing bolt is facilitated. Further, even if a large rotational force is applied to the attachment-mounting member, a portion fixed with the fixing bolt is prevented from being broken.

According to another aspect, in the lens barrel, the attachment-mounting member preferably includes a flange engagement portion formed to be inserted into the notched portion and engaged with the flange portion.

According to this configuration, the flange engagement portion can be inserted into a flange notched portion and engaged with the flange portion. Thus, even if the protective member intends to come off the attachment-mounting member, the flange engagement portion engages with the flange portion, and the protective member is further unlikely to come off the attachment-mounting member.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
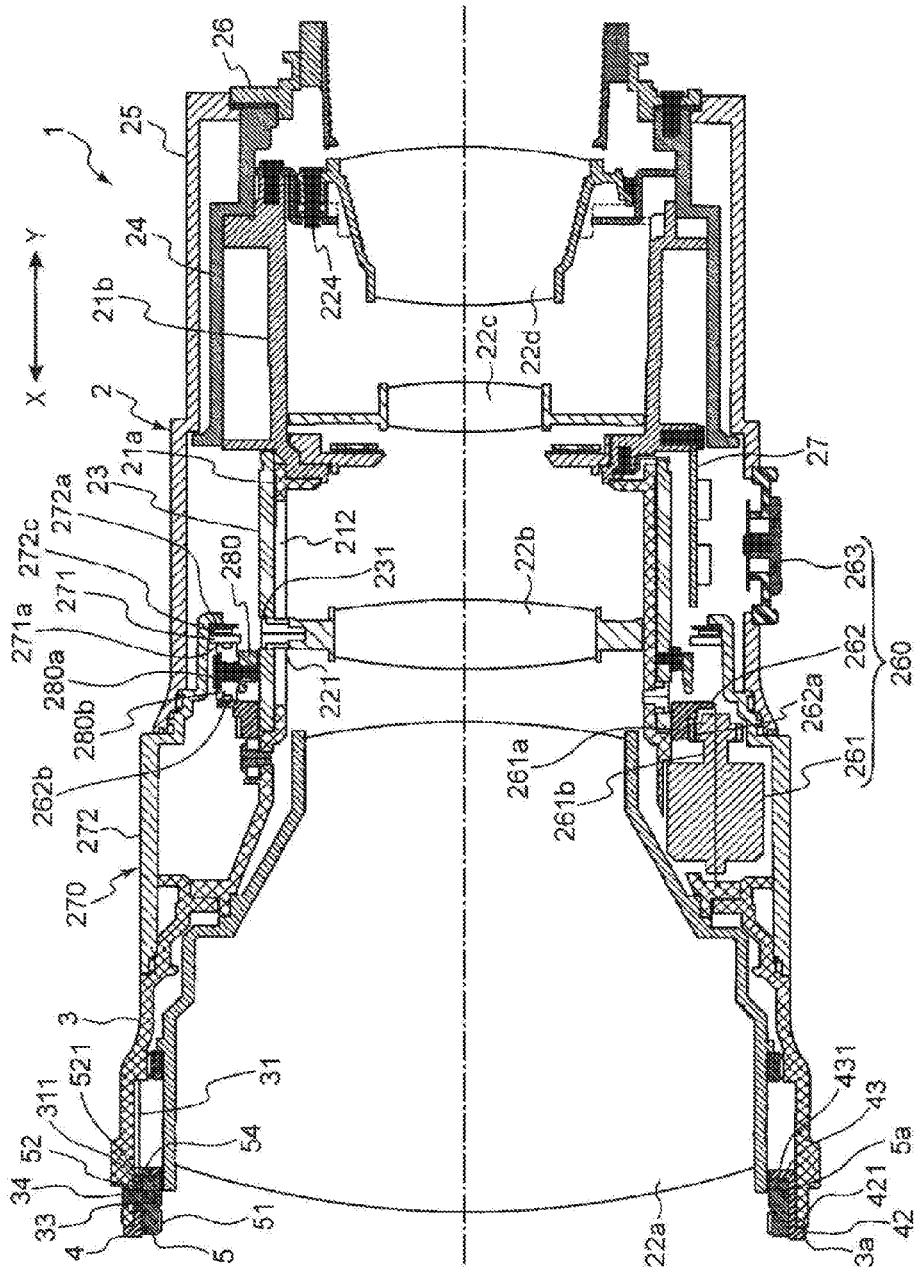
FIG. 1 is a cross-sectional view of a lens barrel according to an embodiment of the present invention.
Figure 2:
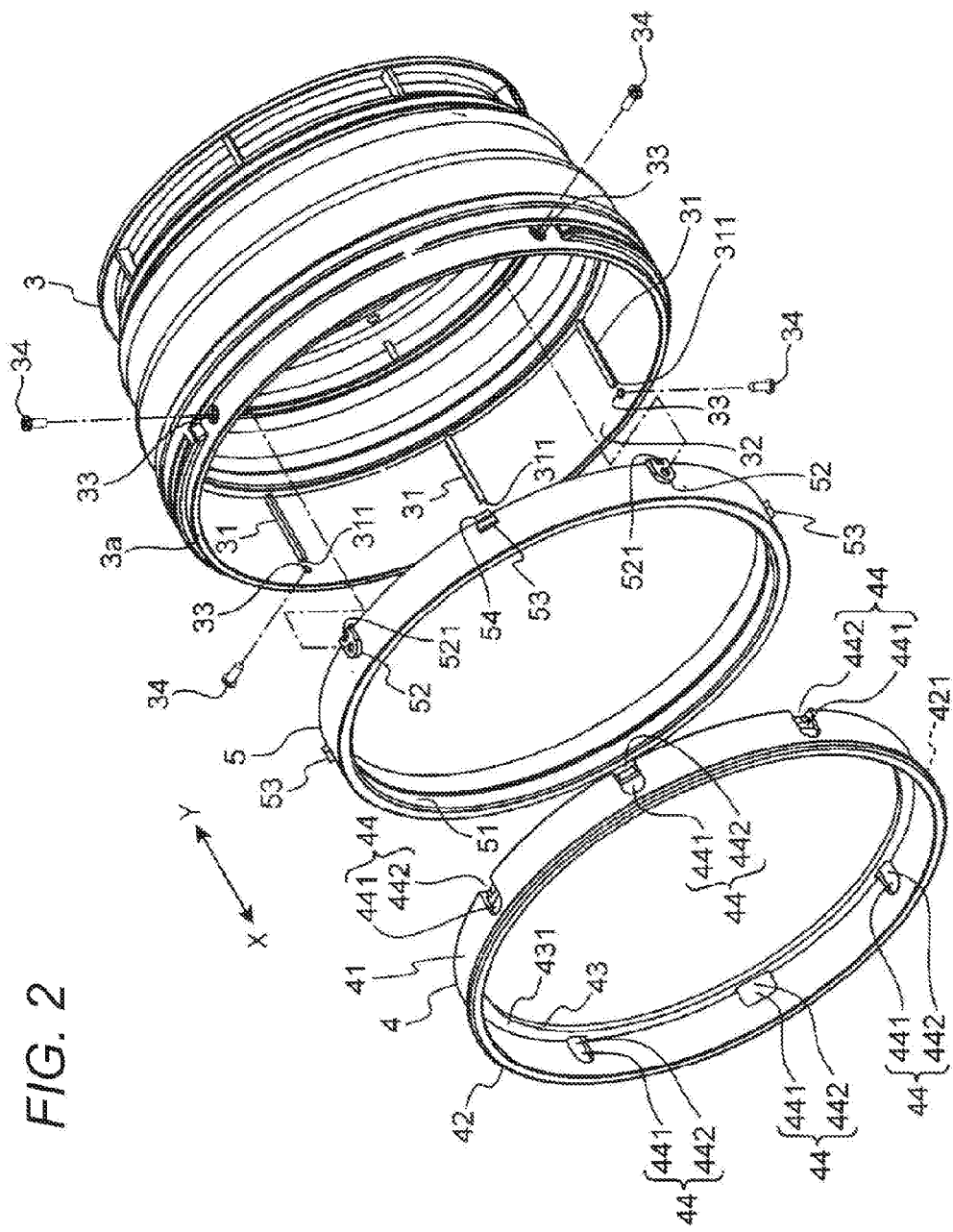
FIG. 2 is an exploded perspective view of an exterior member, a protective member, and an attachment-mounting member used for the lens barrel of FIG. 1.

Hereinafter, an embodiment of the present invention will be described in detail with reference to the drawings. However, the scope of the invention is not limited to the illustrated examples. FIG. 1 is a cross-sectional view of a lens barrel according to an embodiment of the present invention, and FIG. 2 is an exploded perspective view of an exterior member, a protective member, and an attachment-mounting member used for the lens barrel of FIG. 1. Note that, in the figures, an X direction is defined as an object side, and a Y direction is defined as an image side for explanation.

As illustrated in FIG. 1, the lens barrel 1 according to the present embodiment includes a lens barrel body 2, the exterior member 3, the protective member 4, and the attachment-mounting member 5.

In the present embodiment, the lens barrel body 2 includes fixed cylinders 21a and 21b, lens groups 22a to 22d, a cam cylinder 23, a reinforcement member 24, and a cover member 25.

In the present embodiment, the fixed cylinders include a first fixed cylinder 21a and a second fixed cylinder 21b. The first fixed cylinder 21a includes a metal and has a cylindrical shape, and the second fixed cylinder 21b includes a synthetic resin and has a cylindrical shape, and is fixedly connected to an end on the image side of the first fixed cylinder 21a, with a bolt.

Further, a substrate (circuit board) 27 is mounted to an axial end on the object side of the second fixed cylinder 21b. The substrate 27 for example detects a turning position of the cam cylinder 23 relative to the first fixed cylinder 21a, or controls an autofocus drive motor 261 described later, and is connected to an electrical component such as an autofocus drive motor 261 through a flexible printed circuit board not illustrated.

The second fixed cylinder 21b according to the present embodiment is stored on the inner periphery of the reinforcement member 24 including a metal and having a substantially cylindrical shape, and the second fixed cylinder 21b is fixedly connected to the reinforcement member 24 with a bolt (not illustrated). Note that the outer periphery of the reinforcement member 24 according to the present embodiment is covered by the cover member 25 disposed on an outer peripheral side. Further, the reinforcement member 24 has an end surface on the image side, a mount member 26 is fixedly connected to the end surface, and the lens barrel 1 is removably mounted to a camera body through the mount member 26.

In the present embodiment, the lens groups include a first lens group 22a, a second lens group 22b, a third lens group 22c, and a fourth lens group 22d, which are sequentially disposed from the object side to the image side, as illustrated in FIG. 1.

The first lens group 22a includes one or more lenses, and is fixedly held in the first fixed cylinder 21a.

The second lens group 22b includes one or more lenses, is held in the first fixed cylinder 21a to be moved in an optical axis direction (X-Y direction, axial direction of the first fixed cylinder 21a), and forms a movable lens group. The second lens group 22b includes a guide groove 212 and a guide shaft 221, on the outer peripheral side. The guide groove 212 is provided in the first fixed cylinder 21a, and the guide shaft 221 is movably inserted into a cam groove 231 of the cam cylinder 23 described later. When the guide shaft 221 is guided and moved along the guide groove 212 and the cam groove 231, the second lens group 22b is moved in the optical axis direction. Note that movement of the second lens group 22b will be further described later.

The third lens group 22c includes one or more lenses, and is fixedly held in the second fixed cylinder 21b.

The fourth lens group 22d includes one or more lenses, and is held in the second fixed cylinder 21b with a plurality of adjusting bolts 224 (only one is illustrated in FIG. 1) to be adjusted in inclination in the optical axis direction and position in the optical axis direction.

The cam cylinder 23 movably operates the lens group in the optical axis direction. In the present embodiment, the cam cylinder 23 movably operates the second lens group 22b in the optical axis direction. The cam cylinder 23 has a cylindrical body, and includes the cam groove 231 in which guide shaft 221 of the second lens group 22b is movably inserted. The cam groove 231 is formed to be inclined in the axial direction in a plan view.

The cam cylinder 23 formed as described above is turnably held on a part of the outer peripheral side of the first fixed cylinder 21a, on the image side, not to be moved relative to the first fixed cylinder 21a in the axial direction and to be turned about the optical axis (about the axis of the first fixed cylinder 21a), and the cam cylinder 23 is turnably operated by a turning operation member.

Specifically, in the present embodiment, the turning operation member includes an autofocus operation member 260, a manual operation member 270, and an output ring 280.

The autofocus operation member 260 includes the autofocus drive motor 261, an automatic input ring 262, and an autofocus switch (switch member) 263. The autofocus drive motor 261 is held by the first fixed cylinder 21a, the automatic input ring 262 is cooperatively connected to the autofocus drive motor (drive motor) 261 through gears, and the autofocus switch (switch member) 263 switches the autofocus drive motor 261 between an operation state in which the autofocus drive motor 261 can be operated and an non-operation state in which the autofocus drive motor 261 is not operated.

The automatic input ring 262 has a cylindrical shape. In the present embodiment, the automatic input ring 262 includes, on an outer periphery, a second gear 262a meshing with a first gear 261a of the output shaft 261b. Further, the automatic input ring 262 includes, on a surface on the image side, a first roller rolling unit 262b on which a rolling roller 280b of the output ring 280 rolls. The rolling roller 280b of the output ring 280 will be described later.

The automatic input ring 262 configured as described above is disposed on the outer periphery of the first fixed cylinder 21a to be turned about the axis of the first fixed cylinder 21a.

The autofocus switch 263 is mounted to the cover member 25, and the autofocus switch 263 can be operated from outside.

The manual operation member 270 is manually operated to turn the cam cylinder 23, and includes a manual input ring 271, and a manual operation ring 272 operating the manual input ring 271. The manual input ring 271 has a flat ring shape, and includes, on a surface on the object side, a second roller rolling unit 271a on which the rolling roller 280b of the output ring 280 rolls. The rolling roller 280b of the output ring 280 will be described later.

The manual input ring 271 is disposed on the image side of the automatic input ring 262, separated from the automatic input ring 262 at a predetermined interval, to be turned about the axis of the first fixed cylinder 21a.

The manual operation ring 272 has a cylindrical shape, and includes, on an inner peripheral side, an operation unit 272a constituted by an integrally formed flange. The operation unit 272a operates the manual input ring 271 from the image side through an input ring-urging spring 272c.

The output ring 280 has a cylindrical shape. The output ring 280 is provided with three (only one is illustrated in FIG. 1) cooperation members held by the output ring 280.

The cooperation members cooperatively move the output ring 280 and the automatic input ring 262, and cooperatively move the output ring 280 and the manual input ring 271. Each of the cooperation member includes a roller shaft 280a, and a rolling roller 280b turnably supported by the roller shaft 280a.

Further, the output ring 280 is fixedly connected to the cam cylinder 23 by a connection member not illustrated.

The output ring 280 configured as described above is disposed between the automatic input ring 262 and the manual input ring 271 in the axial direction of the first fixed cylinder 21a, on the outer peripheral side of the first fixed cylinder 21a, to be turned about the axis of the first fixed cylinder 21a (about the optical axis).

Further, in this state, the rolling roller 280b is disposed between the first roller rolling unit 262b of the automatic input ring 262 and the second roller rolling unit 271a of the manual input ring 271, and the rolling roller 280b is compressively held between the first roller rolling unit 262b and the second roller rolling unit 271a by the input ring-urging spring 272c.

More specifically, the input ring-urging spring 272c including a corrugated ring-shaped spring is provided between the manual operation ring 272 and the manual input ring 271, and the input ring-urging spring 272c urges the manual input ring 271 toward the automatic input ring 262 on the object side.

Owing to an urging force of the urging of the input ring-urging spring 272c, the second roller rolling unit 271a of the manual input ring 271 presses the rolling roller 280b, and this pressing causes the rolling roller 280b to press the first roller rolling unit 262b of the automatic input ring 262. Thus, the rolling roller 280b is held between the first roller rolling unit 262b and the second roller rolling unit 271a while being applied with a certain urging force.

When moving the second lens group 22b by the autofocus operation member 260, the autofocus switch 263 is operated to be turned on. Therefore, a voltage is applied to the autofocus drive motor 261 from the substrate 27, and thus, the autofocus drive motor 261 is operated.

Further, the automatic input ring 262 meshing with the first gear 261a turns following this operation of the autofocus drive motor 261. The rolling roller 280b rolls the first roller rolling unit 262b following this turning. At that time, the rolling roller 280b is held between the first roller rolling unit 262b and the second roller rolling unit 271a of the manual input ring 271, and the manual input ring 271 is restricted in turning by, for example, the urging force of the input ring-urging spring 272c. Thus, the rolling roller 280b is moved around the first fixed cylinder 21a while being rotated, and thus, the output ring 280 is turned holding the rolling roller 280b.

The cam cylinder 23 is turned following the turning of the output ring 280. In addition, the guide shaft 221 inserted into the guide groove 212 of the first fixed cylinder 21a and the cam groove 231 of the cam cylinder 23 moves in the grooves 212 and 231 by the turning of the cam cylinder 23, and thus, the second lens group 22b is moved in the optical axis direction of the first fixed cylinder 21a.

In contrast, when the autofocus switch 263 is operated to be turned off, the manual operation ring 272 is manually operated to be turned. Thus, the manual input ring 271 is turned, and the rolling roller 280b is rolled on the second roller rolling unit 271a. At that time, the automatic input ring 262 holding the rolling roller 280b meshes with the autofocus drive motor 261 and cannot turn, and thus, the rolling roller 280b is moved around the first fixed cylinder 21a while being rotated, and the output ring 280 is turned as a whole. Similar to the configuration as described above, the rest is configured so that when the cam cylinder 23 is turned, the second lens group 22b is driven in the optical axis direction of the first fixed cylinder 21a.

Next, a description will be made of the exterior member 3. As illustrated in FIG. 2, the exterior member 3 includes, at one axial end on the object side, a plurality of (eight in the present embodiment) ribs (positioning projection pieces) 31, a protective member insertion portion 32, and a plurality of bolt insertion holes 33.

The protective member insertion portion 32 is formed on an inner periphery of the axial end on the object side of the exterior member 3.

The ribs 31 are disposed on an inner peripheral surface of the exterior member 3 at equal intervals along a circumferential direction. Each of the ribs 31 projects radially inwardly from the inner peripheral surface of the exterior member 3 to have a rectangular cross-section, and extends to have a predetermined length along the axial direction, projecting to the protective member insertion portion 32.

Each of the ribs 31 includes a contact stop portion 311 at a longitudinal end surface on the object side. The contact stop portion 311 is formed at a predetermined depth position from an axial end surface 3a on the object side of the exterior member 3, and is disposed in the protective member insertion portion 32.

The plurality of bolt insertion holes 33 (four in the present embodiment) each insert therein a fixing bolt 34 fixing the attachment-mounting member 5 to the exterior member 3, and are formed at equal intervals along a circumferential direction of the exterior member 3. Each of the bolt insertion holes 33 is formed to penetrate from an outer periphery to the protective member insertion portion 32 of the exterior member 3.

As illustrated in FIG. 1, in the exterior member 3 formed as described above, an axial end on the image side of the exterior member 3 is fixedly mounted to an axial end on the object side of the first fixed cylinder 21a, the axial end on the object side of the exterior member 3 projects from the lens barrel body 2 to the object side.

The attachment-mounting member 5 is configured to mount an attachment such as a filter, has a cylindrical shape as illustrated in FIG. 2, and includes, on an inner periphery, a mounting portion 51 removably mounting the attachment.

Figure 4:
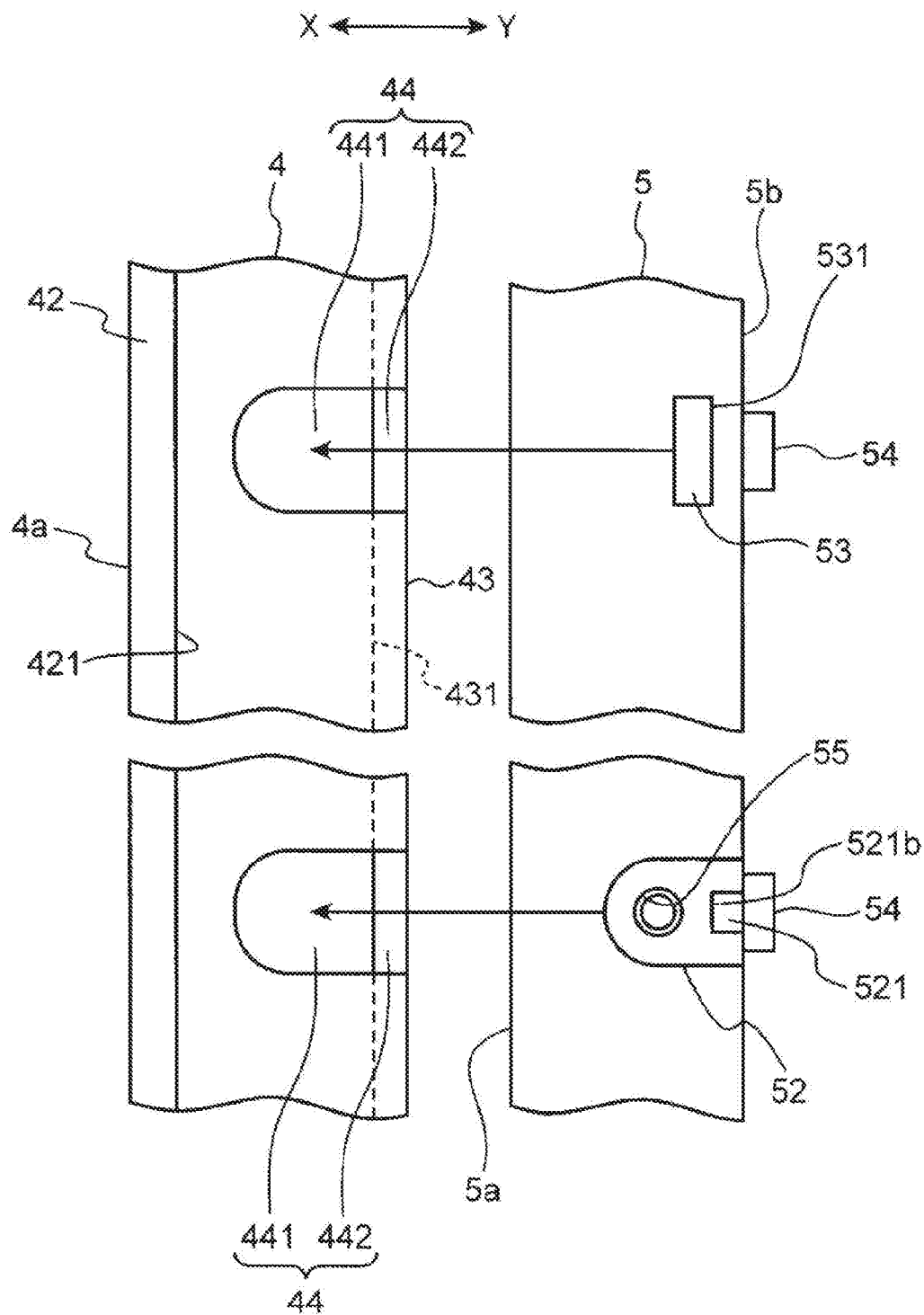
FIG. 4 is an enlarged explanatory diagram of part of the protective member and the attachment-mounting member viewed from the top side, in which the attachment-mounting member and the protective member are assembled to each other.

Further, as illustrated in FIG. 4, the attachment-mounting member 5 includes a plurality of (eight in the present embodiment) projection portions 52 and 53, a flange engagement portion 54, and a screw hole (fixing portion) 55. The plurality of projection portions 52 and 53 are formed, on the outer periphery, at positions corresponding to the ribs 31, the flange engagement portion 54 are formed on an end surface on the image side of the attachment-mounting member 5, and the screw hole 55 is threadedly engaged with the fixing bolt 34.

In the present embodiment, each of the projection portions includes a first projection portion 52 having an arcuate portion, and a rectangular second projection portion 53.

As illustrated in FIG. 2, the first projection portion includes four first projection portions 52 (only two are illustrated in FIG. 2) disposed at equal intervals along a circumferential direction of the attachment-mounting member 5. Each of the first projection portion 52 projects by a predetermined amount radially outwardly from the outer peripheral surface of the attachment-mounting member 5 to abut on the inner peripheral surface of the exterior member 3.

Figure 3:
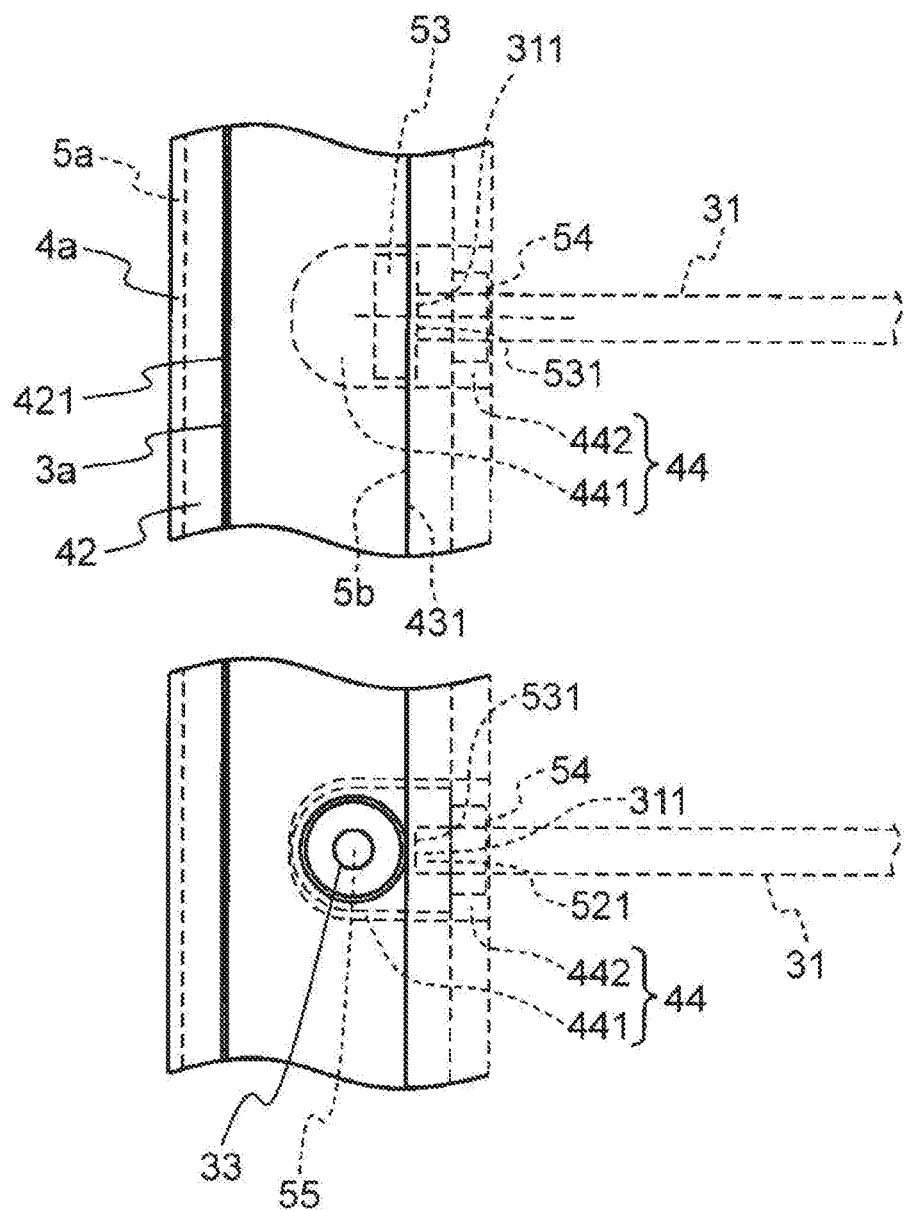
FIG. 3 is an enlarged explanatory diagram illustrating part of an assembled state of an exterior member, a protective member, and an attachment-mounting member, viewed from the top side.
Figure 5:
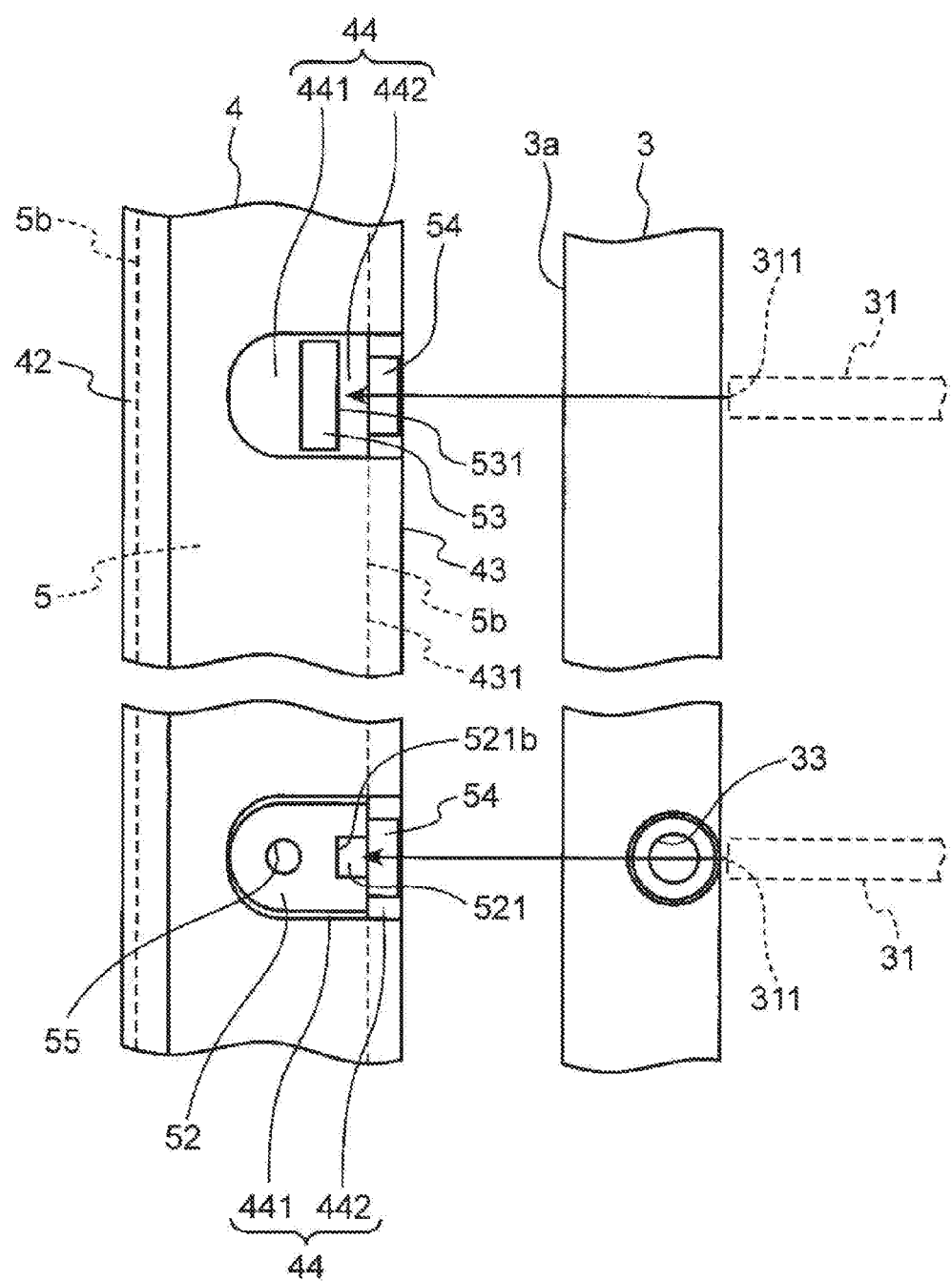
FIG. 5 is an enlarged explanatory diagram of part of the exterior member, the protective member, and the attachment-mounting member, viewed from the top side, in which the protective member and attachment-mounting member having been assembled are assembled to the exterior member.

Further, as illustrated in FIGS. 3 to 5, each of the first projection portion 52 includes, at an end on the image side, an insertion recess portion 521 receiving insertion of an end on the object side of the rib 31. The insertion recess portion 521 is formed to have a width substantially the same as a circumferential width of the rib 31, and the insertion recess portion 521 has a back end surface forming a first rib abutment portion 521b abutting on the contact stop portion 311 of the rib 31.

As illustrated in FIG. 2, the second projection portion 53 includes four second projection portions 53 (only three are illustrated in FIG. 2), along the circumferential direction of the attachment-mounting member 5, The four second projection portions 53 are disposed at a circumferential center between two first projection portions 52 adjoining in the circumferential direction. As illustrated in FIGS. 3 to 5, each of the second projection portions 53 has a circumferential width the same as the circumferential width of the first projection portion 52, and projects by the same amount as that of the first projection portion 52, radially outwardly from the outer peripheral surface of the attachment-mounting member 5, to abut on the inner peripheral surface of the exterior member 3.

Further, the second projection portion 53 includes, on an end surface on the image side, a second rib abutment portion 531 abutting on the contact stop portion 311 of the rib 31.

The flange engagement portion 54 is removably engaged with a flange portion 43 of the protective member 4, and includes a plurality of flange engagement portions 54 formed on an axial end surface 5b on the image side of the attachment-mounting member 5, along the circumferential direction.

In the present embodiment, the flange engagement portion 54 includes eight flange engagement portions 54 formed at the same positions as the projection portions 52 and 53 on the end surface 5b on the image side of the attachment-mounting member 5 in the circumferential direction. Each of the flange engagement portions 54 projects on the image side axially from the end surface 5b to have a predetermined length and a predetermined width.

In the present embodiment, the screw hole 55 is formed from an outer peripheral surface of each first projection portion 52 to have a predetermined depth.

The protective member 4 protects the exterior member 3, and includes a synthetic rubber cylindrical body. The protective member 4 includes a cylindrical body 41, an exterior-member protection portion 42, and a flange portion 43, as illustrated in FIG. 2. The exterior-member protection portion 42 is formed at an axial end on the object side of the cylindrical body 41, and the flange portion 43 is formed at an axial end on the image side of the cylindrical body 41.

The cylindrical body 41 has an outer diameter slightly smaller than an inner diameter of the protective member insertion portion 32 of the exterior member 3, and the cylindrical body 41 is formed to be fitted on an inner periphery of the protective member insertion portion 32. Further, the cylindrical body 41 has an inner diameter substantially the same or slightly smaller than an outer diameter of the attachment-mounting member 5, so that the attachment-mounting member 5 can be closely fitted into the inner diameter of the cylindrical body 41. Thus, the protective member is unlikely to be shifted in position and readily assembled.

As illustrated in FIGS. 1, 3, and 4, the exterior-member protection portion 42 projects radially outwardly from an outer periphery of the cylindrical body 41, and includes, on an end surface on the image side, an exterior member facing portion 421 disposed to face the end surface 3a on the object side of the exterior member 3. In the present embodiment, the exterior member facing portion 421 is formed over the end surface on the image side of the exterior-member protection portion 42.

The flange portion 43 projects radially inwardly from the outer periphery of the cylindrical body 41, and includes, on an end surface on the object side, an attachment-mounting member facing portion 431 disposed to face the axial end surface 5b of the attachment-mounting member 5. In the present embodiment, the attachment-mounting member facing portion 431 is formed over the end surface on the object side of the flange portion 43. In the present embodiment, the protective member includes a synthetic rubber, but otherwise, the protective member preferably has an elastic body including an elastic material such as a polyurethane resin to be appropriately changed.

Further, notched holes (notched portion) 44 are formed in the protective member 4, at positions corresponding to the projection portions 52 and 53 and the flange engagement portions 54 of the attachment-mounting member 5. Each of the notched holes 44 includes a cylindrical body notched portion 441 formed in the cylindrical body 41, and a flange notched portion 442 formed in the flange portion 43.

The cylindrical body notched portions 441 are disposed at positions corresponding to the first projection portions 52 and the second projection portions 53, in the cylindrical body 41. The cylindrical body notched portions 441 receiving the projection portions are formed to penetrate from an inner surface to an outer surface of the cylindrical body 41 to receive the first projection portions 52 and the second projection portions 53, respectively.

The flange notched portions 442 are disposed at positions corresponding to the flange engagement portions 54, in the flange portion 43. The flange notched portions 442 are formed to penetrate from an inner surface to an outer surface of a radially outside portion in the flange portion 43 to receive the flange engagement portion 54.

In the present embodiment, the flange notched portions 442 communicate with the cylindrical body notched portions 441, respectively, and one flange notched portion 442 and one cylindrical body notched portion 441 form one notched hole 44. That is, the notched hole 44 is formed from the cylindrical body 41 to the flange portion 43 to have a size large enough to receive the projection portions 52 and 53 and the flange engagement portions 54, penetrating from an inner surface to an outer surface of the protective member 4. Owing to this configuration, the notched hole 44 can be readily manufactured upon molding the protective member 4, and the protective member 4 can be assembled to the attachment-mounting member 5 while being elongated.

Next, the attachment-mounting member 5 and the protective member 4 are, for example, fixedly assembled to the exterior member 3, as described below.

First, the protective member 4 is mounted to an outer periphery of the attachment-mounting member 5. For example, as illustrated in FIG. 4, the mounting is performed so that while the projection portions 52 and 53 and the flange engagement portion 54, and the flange notched portion 442 and the cylindrical body notched portion 441 of the protective member 4 are positioned to each other, the end on the image side of the protective member 4 is for example enlarged, the projection portions 52 and 53 are inserted into the cylindrical body notched portions 441, and the flange engagement portion 54 is inserted into the flange notched portion 442 receiving the engagement portion (see FIG. 5).

In this state, the screw hole 55 of the attachment-mounting member 5 is disposed on the inside of the cylindrical body notched portion 441. Further, as illustrated in FIG. 1, the attachment-mounting member facing portion 431 of the protective member 4 faces the axial end surface 5b of the attachment-mounting member 5. In the present embodiment, the attachment-mounting member facing portion 431 of the protective member 4 is disposed to face the axial end surface 5b of the attachment-mounting member 5, with little clearance.

As illustrated in FIG. 5, the protective member 4 mounted to the attachment-mounting member 5 is inserted into the protective member insertion portion 32 of the exterior member 3. The protective member 4 is inserted so that the rib 31 of the exterior member 3 is inserted into the insertion recess portion 521 of the first projection portion 52, until the first rib abutment portion 521b formed in the insertion recess portion 521, the second rib abutment portion 531 of the second projection portion 53, and a contact stop portion 311 of each rib 31 abut on each other (see FIG. 3).

As illustrated in FIGS. 1 and 3, in this state, an end on the object side of the protective member 4 project toward the object side relative to an end on the object side of the exterior member 3.

The first rib abutment portion 521b and the second rib abutment portion 531 abut on the contact stop portions 311 of the ribs 31, and the attachment-mounting member 5 and the protective member 4 are positioned with respect to the exterior member 3 in the axial direction. Note that the contact stop portion 311 provided at the rib 31 brings about effective positioning without increasing the thickness of the exterior member 3, and thus the exterior member 3 can be reduced in weight, and even if the exterior member is molded from a resin, a sink mark or the like does not occur, and a quality thereof can be maintained. In addition, insertion of the rib 31 into the insertion recess portion 521 of the first projection portion 52 can position the attachment-mounting member 5 and the protective member 4 with respect to the exterior member 3 in a circumferential direction.

Accordingly, in this state, the attachment-mounting member 5 and the protective member 4 are disposed to be positioned with respect to the exterior member 3 in the circumferential direction and the axial direction, and the bolt insertion holes 33 of the exterior member 3 matches the screw holes 55 of the attachment-mounting member 5.

Further, in this state, the end surface 3a on the object side of the exterior member 3 faces the exterior-member protection portion 42 of the protective member 4. In the present embodiment, the end surface 3a of the exterior member 3 is disposed to face the exterior-member protection portion 42 of the protective member 4, with least clearance.

In this state, the fixing bolt 34 is inserted into the bolt insertion hole 33 of the exterior member 3, and is threadedly engaged with the screw hole 55 of the attachment-mounting member 5. Thus, the attachment-mounting member 5 and the protective member 4 are fixed to the exterior member 3.

At that time, the first projection portion 52 formed around the screw hole 55 abuts on an inner surface of the exterior member 3, and thus, the attachment-mounting member 5 and the exterior member 3 are reliably fixed.

As configured above, the exterior-member protection portion of the protective member projects to the object side relative to the end surface on the object side of the exterior member and the end surface on the object side of the attachment-mounting member, and thus, the end surface on the object side of the exterior member and an end surface on the object side of the attachment-mounting member are protected by the protective member.

Further, the cylindrical body of the protective member is disposed between the exterior member and the attachment-mounting member, in the radial direction of the exterior member. Therefore, for example, even if the protective member changes over the years, the protective member is unlikely to come off the exterior member. In addition, the protective member includes the exterior-member protection portion at the axial end on the object side of the cylindrical body, and the flange portion at the end on the image side, so that the protective member is restricted in movement in the axial direction of the exterior member, and the protective member is unlikely to come off the exterior member.

Further, each of the fixing portions is disposed to be positioned on the inside of the cylindrical body notched portion, and thus, for example, when the attachment-mounting member and the exterior member are fixed through a fixing bolt, the attachment-mounting member and the exterior member are reliably fixed.

Further, the projection portion defines a radial position of the attachment-mounting member relative to the exterior member, and an axis of the attachment-mounting member is aligned with an axis of the exterior member to inhibit eccentricity to each other. Thus, for example, while the attachment-mounting member is mounted to the exterior member, a lens group can be inserted on the inner peripheral side of the exterior member to be disposed at a predetermined position.

Further, for example, when the attachment-mounting member and the exterior member are fixed through the fixing bolt, the attachment-mounting member and the exterior member can be further reliably fixed.

Further, the exterior member includes the plurality of ribs having the contact stop portion, and the attachment-mounting member is axially positioned with respect to the exterior member. Therefore, for example when the attachment-mounting member is inserted into the exterior member until the projection portion makes contact with and stops at the contact stop portion, while the protective member is mounted to the attachment-mounting member, the attachment-mounting member and the protective member are disposed at a predetermined position in the axial direction of the exterior member. Even if the attachment-mounting member has a low rigidity, the attachment-mounting member can be held firmly without a large number of fixing bolts, and the attachment-mounting member is readily reduced in size.

Further, the projection portion includes the insertion recess portion configured to receive insertion of the rib, and the attachment-mounting member is circumferentially positioned with respect to the exterior member. Therefore, for example, when the exterior member and the attachment-mounting member are fixed through the fixing bolt, the exterior member and the attachment-mounting member can be readily fixed to each other with the fixing bolt, and work using the fixing bolt is facilitated. Further, even if a large rotational force is applied to the attachment-mounting member, a portion fixed with the fixing bolt is prevented from being broken.

Further, the flange notched portion is formed in the flange portion, and the attachment-mounting member includes the flange engagement portion formed to be inserted into the flange notched portion and engaged with the flange portion, and thus, when the protective member intends to come off the attachment-mounting member, the flange engagement portion engages with flange portion, and the protective member is further unlikely to come off the attachment-mounting member.

Note that, in the above-mentioned embodiment, the flange notched portion 442 and the cylindrical body notched portion 441 are constituted by one notched hole 44, but are not limited to this mode, and can be changed appropriately. For example, the flange notched portion 442 and the cylindrical body notched portion 441 may be separately formed at different positions in the circumferential direction. However, when the flange notched portion 442 and the cylindrical body notched portion 441 communicate with each other and formed by the one notched hole 44, it is preferable that the flange notched portion 442 and the cylindrical body notched portion 441 are readily formed. Further, when the flange notched portion 442 and the cylindrical body notched portion 441 communicate with each other, the hole is increased in size, and the hole is enlarged upon assembling the protective member to the attachment-mounting member, and assembling is facilitated. When the flange engagement portion is engaged with the flange portion, even if an external force is applied to the assembly, the assembly is unlikely to be disassembled.

Although the present invention has been described and illustrated in detail, it is clearly understood that the same is by way of illustrated and example only and is not to be taken by way of limitation, the scope of the present invention being interpreted by terms of the appended claims.

What is claimed is:
1. A lens tube comprising:
   a cylindrical exterior member having one axial end disposed on an object side and the other axial end disposed on an image side;
   a cylindrical protective member including an elastic body protecting the exterior member; and
   a cylindrical attachment-mounting member disposed on the inside of the exterior member, the cylindrical attachment-mounting member being configured to mount an attachment,
   the protective member including:
      a cylindrical body disposed between the exterior member and the attachment-mounting member in a radial direction of the exterior member;
      an exterior-member protection portion provided at an axial end on the object side of the cylindrical body that projects to the object side of an end surface of the exterior member; and
      a flange portion provided at an axial end on the image side of the cylindrical body, the flange portion projecting radially inwardly from an inner periphery of the cylindrical body, facing an axial end surface on the image side of the attachment-mounting member in the axial direction of the attachment-mounting member,
   the cylindrical body and the flange portion having at least three notched portions formed in a circumferential direction to be notched to penetrate from outer peripheral surfaces of the cylindrical body and the flange portion to the inner peripheral surfaces thereof,
   the attachment-mounting member including
      at least three fixing portions on the outer periphery in a circumferential direction, the fixing portions being configured to fix the attachment-mounting member to the exterior member,
      the fixing portions being disposed to be positioned on the inside of the notched portions.

2. The lens tube according to claim 1, wherein
the attachment-mounting member includes projection portions inserted into the notched portions, and
the projection portions are provided to project radially outwardly from an outer peripheral surface of the attachment-mounting member, abutting on an inner peripheral surface of the exterior member,
the fixing portions being formed in whole or part of the projection portions.

3. The lens tube according to claim 2, wherein
the exterior member includes a plurality of positioning projection pieces provided on the inner peripheral surface of the exterior member to project radially inwardly from the inner peripheral surface,
the positioning projection pieces including a contact stop portion provided on an end surface on the object side of each positioning projection piece, the contact stop portion being configured to make contact with and stop the projection portion.

4. The lens tube according to claim 1, wherein the attachment-mounting member includes a flange engagement portion formed to be inserted into the notched portion and engaged with the flange portion.

5. A lens tube comprising:
a cylindrical exterior member having one axial end disposed on an object side and the other axial end disposed on an image side;
a cylindrical protective member including an elastic body protecting the exterior member; and
a cylindrical attachment-mounting member disposed on the inside of the exterior member, the cylindrical attachment-mounting member being configured to mount an attachment,
the protective member including:
  a cylindrical body disposed between the exterior member and the attachment-mounting member in a radial direction of the exterior member;
  an exterior-member protection portion provided at an axial end on the object side of the cylindrical body that projects to the object side of an end surface of the exterior member; and
  a flange portion provided at an axial end on the image side of the cylindrical body, the flange portion projecting radially inwardly from an inner periphery of the cylindrical body, facing an axial end surface on the image side of the attachment-mounting member in the axial direction of the attachment-mounting member,
the cylindrical body and the flange portion having at least three notched portions formed in a circumferential direction to be notched to penetrate from outer peripheral surfaces of the cylindrical body and the flange portion to the inner peripheral surfaces thereof,
the attachment-mounting member including
  at least three fixing portions on the outer periphery in a circumferential direction, the fixing portions being configured to fix the attachment-mounting member to the exterior member,
  the fixing portions being disposed to be positioned on the inside of the notched portions;
wherein the attachment-mounting member includes projection portions inserted into the notched portions, and the projection portions are provided to project radially outwardly from an outer peripheral surface of the attachment-mounting member, abutting on an inner peripheral surface of the exterior member, the fixing portions being formed in whole or part of the projection portions;
wherein the exterior member includes a plurality of positioning projection pieces provided on the inner peripheral surface of the exterior member to project radially inwardly from the inner peripheral surface, the positioning projection pieces including a contact stop portion provided on an end surface on the object side of each positioning projection piece, the contact stop portion being configured to make contact with and stop the projection portion; and
wherein at least one of the projection portions includes an insertion recess portion configured to receive insertion of the positioning projection piece to prevent circumferential turning of the attachment-mounting member to the exterior member.

* * * * *